United States Patent
Dwyer et al.

(10) Patent No.: US 7,523,661 B2
(45) Date of Patent: Apr. 28, 2009

(54) METHODS AND SYSTEMS FOR LIQUID VOLUMETRIC MEASUREMENT

(75) Inventors: Michael D. Dwyer, Seminole, FL (US); David R. Hollingsworth, St. Petersburg, FL (US); William C. Bourne, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 11/461,973

(22) Filed: Aug. 2, 2006

(65) Prior Publication Data

US 2008/0028852 A1 Feb. 7, 2008

(51) Int. Cl.
*G01F 23/00* (2006.01)

(52) U.S. Cl. ............................ 73/295; 73/304 R

(58) Field of Classification Search .............. 73/1.31, 73/1.73, 861, 861.01, 861.02, 204.11, 204.14, 73/204.17, 204.19, 204.22, 204.24, 204.23, 73/204.25, 204.26, 290 R, 295, 304 R, 304 C
See application file for complete search history.

(56) References Cited

U.S. PATENT DOCUMENTS

| | | | |
|---|---|---|---|
| 3,111,031 A | 11/1963 | Kuritza | |
| 4,589,077 A | 5/1986 | Pope | |
| 4,720,997 A * | 1/1988 | Doak et al. | 73/295 |
| 4,827,762 A | 5/1989 | Hasselmann | |
| 4,880,039 A | 11/1989 | Horak | |
| 5,001,924 A | 3/1991 | Walter et al. | |
| 5,085,077 A | 2/1992 | Stapleton et al. | |
| 5,210,769 A | 5/1993 | Seidel et al. | |
| 5,282,386 A | 2/1994 | Niemczyk et al. | |
| 5,719,332 A * | 2/1998 | Wallrafen | 73/295 |
| 5,753,512 A | 5/1998 | Riall et al. | |
| 6,036,296 A | 3/2000 | Axtell et al. | |
| 6,098,457 A * | 8/2000 | Poole | 73/295 |
| 6,289,728 B1 | 9/2001 | Wilkins | |
| 6,293,145 B1 * | 9/2001 | Wallrafen | 73/304 C |
| 6,368,734 B1 * | 4/2002 | Mihara et al. | 428/699 |
| 6,505,509 B2 | 1/2003 | Gualtieri | |
| 6,516,661 B1 | 2/2003 | Spillman, Jr. et al. | |
| 6,553,822 B2 | 4/2003 | Morgan | |
| 6,577,959 B1 | 6/2003 | Chajec et al. | |
| 6,578,416 B1 | 6/2003 | Vogel et al. | |
| 6,662,650 B1 * | 12/2003 | Durkee et al. | 73/295 |
| 6,690,475 B2 | 2/2004 | Spillman, Jr. et al. | |
| 6,992,757 B2 | 1/2006 | Holcomb et al. | |

(Continued)

FOREIGN PATENT DOCUMENTS

GB    2120482 A    11/1983

(Continued)

*Primary Examiner*—Hezron Williams
*Assistant Examiner*—Gunnar J Gissel
(74) *Attorney, Agent, or Firm*—Black Lowe & Graham PLLC

(57) ABSTRACT

An apparatus for measuring a volume of liquid within a vessel is described. The apparatus includes a plurality of devices each having electrical properties that are dependent on a temperature of the device, a constant current source coupled to the plurality of devices, and a unit configured to output a signal based on an amount of voltage at by the plurality of devices. The amount of voltage is based on a number of the plurality of devices immersed in the liquid, and a number of the plurality of devices not immersed in the liquid.

13 Claims, 5 Drawing Sheets

U.S. PATENT DOCUMENTS

2004/0080423 A1* 4/2004 Hall .......................... 340/604
2005/0077182 A1 4/2005 Balisky et al.
2005/0120791 A1 6/2005 Carlson
2008/0016960 A1* 1/2008 Zimmermann et al. ........ 73/295

FOREIGN PATENT DOCUMENTS

JP 57168117 A 10/1982
WO WO 9114926 A 10/1991

* cited by examiner

METHODS AND SYSTEMS FOR LIQUID VOLUMETRIC MEASUREMENT

BACKGROUND OF THE INVENTION

This invention relates generally to volume measurements, and more specifically, to methods and systems for liquid volumetric measurements.

Currently, most liquid volumes within a vessel are measured by simple floats, mounted within the vessel, that move, for example, a wiper on a variable resistor. Such measurement methods have associated problems. For example, utilizing the float to measure an amount of liquid does not work well for irregularly shaped fuel tanks. Additionally, floats are prone to mechanical wear and become inoperable after a time. Float devices may also be affected by corrosive chemicals.

Another type of fuel sensor in use is a type that measures the permittivity (capacitance) of the liquid within a vessel. One of the problems associated with this type of measurement is that different types of liquid have a different permittivity associated therewith, and the measurements are inaccurate unless the contained liquid is pure.

Examples of vessels where a consistent and accurate measurement of liquid volume is desired includes one or more of aircraft fuel tanks, automotive fuel tanks, marine fuel tanks, oil tanks, storage tanks, water tanks, and the like.

BRIEF DESCRIPTION OF THE INVENTION

In one aspect, an apparatus for measuring a volume of liquid within a vessel is provided. The apparatus comprises a plurality of devices each having electrical properties that are dependent on a temperature of the device, a constant current source coupled to the plurality of devices, and a unit configured to output a signal based on a voltage at the plurality of devices. The amount of voltage at devices immersed in the liquid is distinguishable from the amount of voltage at devices not immersed in the liquid In another aspect, a method for measuring a level of liquid in a vessel is provided. The method comprises positioning a plurality of sensor devices within the vessel, applying a current to the sensor devices, determining, based on an amount of voltage at the plurality of sensor devices, a number of the sensor devices that are immersed in the liquid, and calculating the level of liquid within the vessel based on the number of the sensor devices determined to be immersed in the liquid.

In still another aspect, a sensor block for immersion in a vessel of liquid for the purpose of determining an amount of liquid in the vessel is provided. The sensor block comprises a plurality of sensor devices mounted thereon. The devices each have electrical properties such that an amount of voltage at a sensor device immersed in the liquid is distinguishable from the amount of voltage at a sensor device not immersed in the liquid.

DETAILED DESCRIPTION OF THE INVENTION

Described herein are methods and systems for liquid volumetric measurement, which in several embodiments employ applies a device referred to and known as a thermistor. Thermistors change their electrical properties, for example, resistance, based on a temperature of the thermistor. As current passes through a thermistor, its temperature tends to rise as a thermistor is a resistive element. However, if immersed in a liquid, a change in temperature of a thermistor is held to a minimum, assuming that any temperature change takes place at all. As described with reference to the embodiments herein, implementing several of these thermistor devices connected in parallel along the vertical plane of a vessel, some of the thermistors would be immersed in the liquid in the vessel, while other thermistors would be in the void above the liquid. By applying a small amount of constant current to all the thermistors, the ones outside of the liquid will heat up by a larger amount than the ones in the liquid. As further described herein, the differences between the voltage across thermistors within and outside of the liquid is measurable, and directly relates to the amount of liquid within the vessel. More specifically, the resulting voltage provides a measurement of how many of the plurality of devices are immersed in the liquid.

Figure 1:
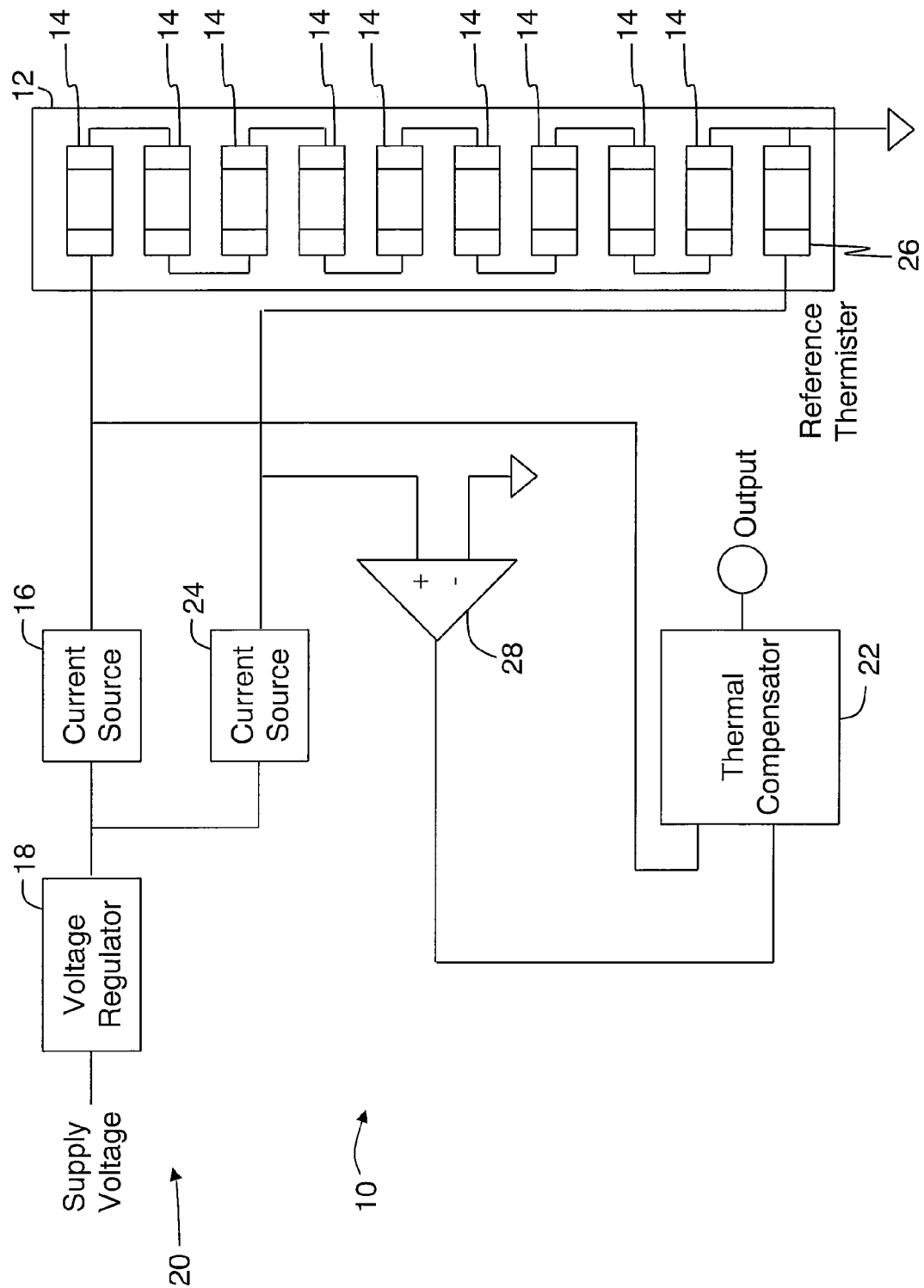
FIG. 1 is a circuit diagram illustrating one embodiment of a liquid level measurement system.

FIG. 1 is a circuit diagram of one embodiment of a liquid volume measurement apparatus 10. Apparatus 10 includes a sensor block 12 onto which is mounted a plurality of devices 14 each having electrical properties that are dependent on a temperature of the device 14. For example, and as described above, in one embodiment the devices 14 are thermistors and are electrically connected in series to one another, as shown in FIG. 1. For example, at 25 degrees Centigrade, one known negative temperature coefficient (NTC) thermistor has a resistance of about 1000 ohms, but at 35 degrees Centigrade that type of thermistor has a resistance of about 674 ohms. Apparatus 10 further includes a current source 16 that is coupled in series with the plurality of devices 14. In the embodiment illustrated, current source 16 is operated utilizing a voltage regulator 18 receiving a voltage from a supply voltage source 20.

Apparatus 10 further includes a unit, for example an operational amplifier 22, that is configured to output a signal based on an amount of voltage at the plurality of devices 14. As described herein, the amount of voltage at the plurality of devices 14 is based on a number of devices 14 (i.e., thermistors) immersed in the liquid, and a number of devices 14 not immersed in the liquid.

In the embodiment illustrated, apparatus 10 further includes a second current source 24 and a reference device 26. Reference device 26, which in one embodiment is a thermistor, is coupled to second current source 24 and placed within the vessel such that it is assumed to be immersed in the liquid at all times. As such, an amount of voltage from second current source 24 and at reference device 26 is at least partially based on a temperature of the liquid in the vessel, and the amount of voltage is utilized as a reference for determining which of devices 14 are at a voltage that would be associated with immersion in the liquid, and which are at a voltage that would be associated with non-immersion. With respect to second current source 24 and reference device 26, and in one embodiment, a unit, such as amplifier 28, is utilized to output a signal based on an amount of voltage at reference device 26.

This signal, as illustrated in FIG. 1 may be utilized as a reference for operational amplifier 22, such that an output of operational amplifier 22 is referenced to an output of amplifier 28, which, as described above, is referenced to the amount of voltage at reference device 26.

Because the above system essentially is making measurements of the temperature of the liquid, the standard provided by reference device 26 is utilized. In one embodiment, reference device 26 is a thermistor placed at the bottom of sensor block 12. This thermistor is intended to always be immersed in the liquid being measured. Utilization of apparatus 10 further assumes that all of the liquid within a vessel is at essentially the same temperature. Amplifier 28 makes the measurements associated with a current passing through the "standard" thermistor (e.g., reference device 26) and then causes adjustments to be made to the measurements made by devices 14 on sensor block 12, specifically, the output of amplifier 28 is utilized as a reference for the signal being input into amplifier 22 from sensor block 12. Calibration of the signals from sensor block 12 is possible over a range of expected operating temperatures.

In particular embodiments, application of a glass passivation layer (not shown) to sensor block 12 (or individual devices 14 and 26) allows for utilization of apparatus 10 in corrosive chemical tanks.

A numerical example is further illustrative of the operation of the embodiment of apparatus 10 illustrated in FIG. 1. In the numerical example, it is assumed the devices 14 and 26 have a resistance of about 1000 ohms at 25 degrees C. and about 1200 ohms at 30 degrees C. As illustrated in FIG. 1, sensor block 12 includes ten sensor devices 14 and one reference device 26. Now continuing with the example, reference device 26 and devices 14 are subjected to one milliamp of current, which is constantly imposed on the plurality of devices 14 when immersed in liquid at a specific temperature. At one milliamp of current, the voltage measured across each device 14 at 30 degrees C. is about 1.2 volts (1200 ohms times 0.001 amps) and at 25 degrees C. the voltage is about 1.0 volt (1000 ohms times 0.001 amps). For this example it is assumed that the liquid keeps the devices cooler when conducting one milliamp of constant current than they would be when conducting one milliamp of constant current and being exposed to air. For ten devices 14 where seven are immersed in the liquid, and three are not immersed, the total voltage across the ten series devices 14 is (7×1000×0.001)+(3×1200×0.001) volts, or 10.6 volts. For ten devices 14 where three are immersed in the liquid, and seven are not immersed, the total voltage across the ten series devices 14 is (3×1000×0.001)+(7×1200×0.001) volts, or 11.4 volts.

Figure 2:
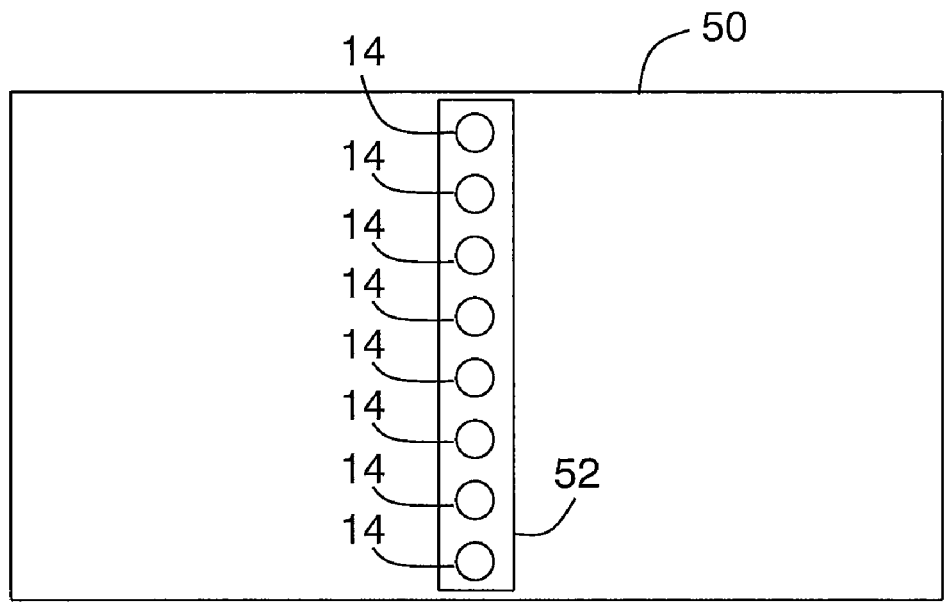
FIG. 2 is a depiction of a sensor block including a placement of sensor device placed a symmetrical vessel.

While the numerical calculations above are fairly straight forward, sensor block 12 is illustrative of a sensor block configuration which is utilized with a symmetrical vessel. FIG. 2 is a depiction of a symmetrical vessel 50 within which another sensor block 52 is incorporated. Sensor block 52 incorporates eight sensor devices 14 which are evenly spaced from one another due to the symmetry of vessel 50.

Figure 3:
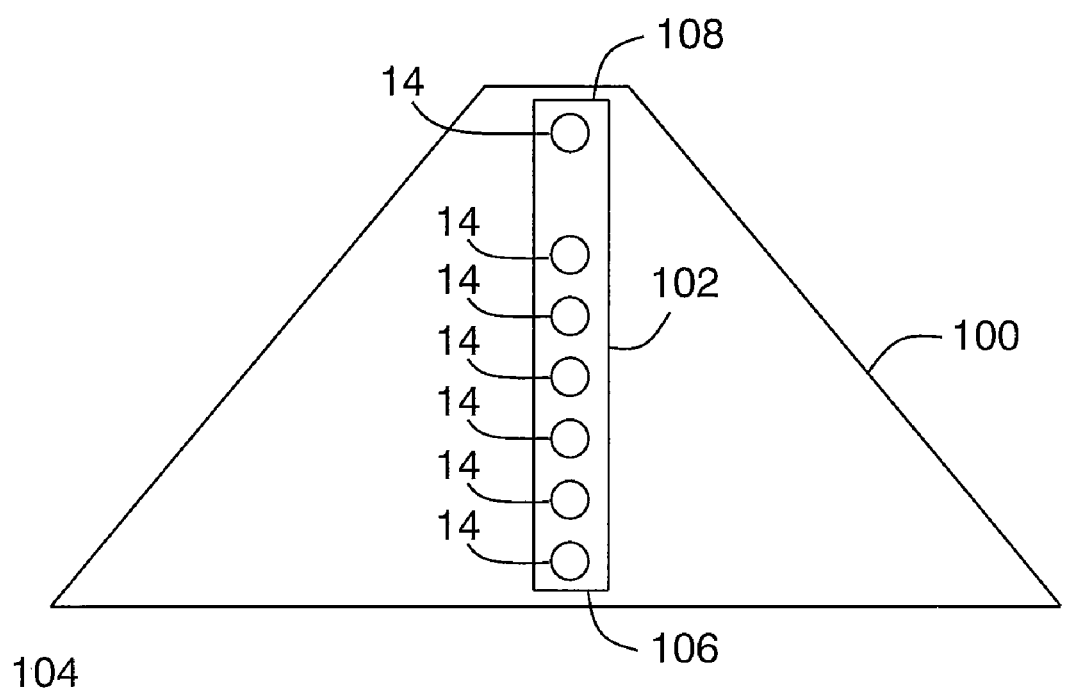
FIG. 3 is a depiction of a sensor block further illustrating a placement of sensor devices for an example non-symmetrical vessel.
Figure 4:
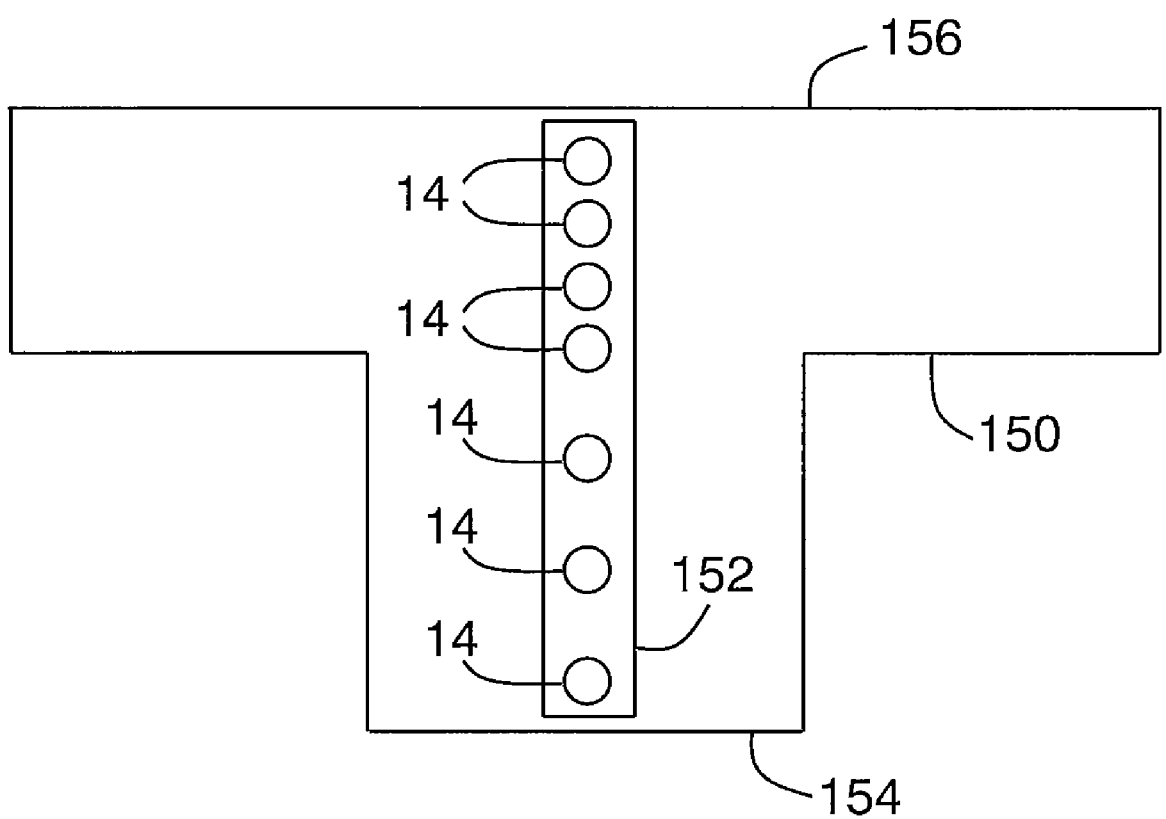
FIG. 4 is a depiction of a sensor block further illustrating a placement of sensor devices for a second example non-symmetrical vessel.

FIG. 3 is a depiction of a non-symmetric vessel 100 incorporating a sensor block 102. Sensor devices 14 are unevenly spread out on sensor block 102 to compensate for the non-symmetry of vessel 100. As a capacity of vessel 100 is larger at its bottom 104, sensor devices 14 are closer together near a bottom 106 of sensor block 102, and farther apart near a top 108 of sensor block 102. Another configuration for a vessel is illustrated by the configuration of vessel 150 in FIG. 4, which includes sensor block 152. As the capacity of vessel 150 is lesser within its bottom portion 154, sensor devices 14 are evenly spaced farther apart than the sensor devices 14 within top portion 156, which are evenly spaced closer together, which corresponds to the increased capacity of top portion 156. Other vessel and sensor block configurations are possible, where a spacing of sensor devices 14 corresponds with contours of the vessel within which they are to be deployed. Currently it is difficult to use a resistive or capacitive measurement system for vessels or containers of non-linear shapes. Application of sensor devices 14 in a non-linear fashion, as described above, is utilized to normalize the liquid volume measurement.

Figure 5:
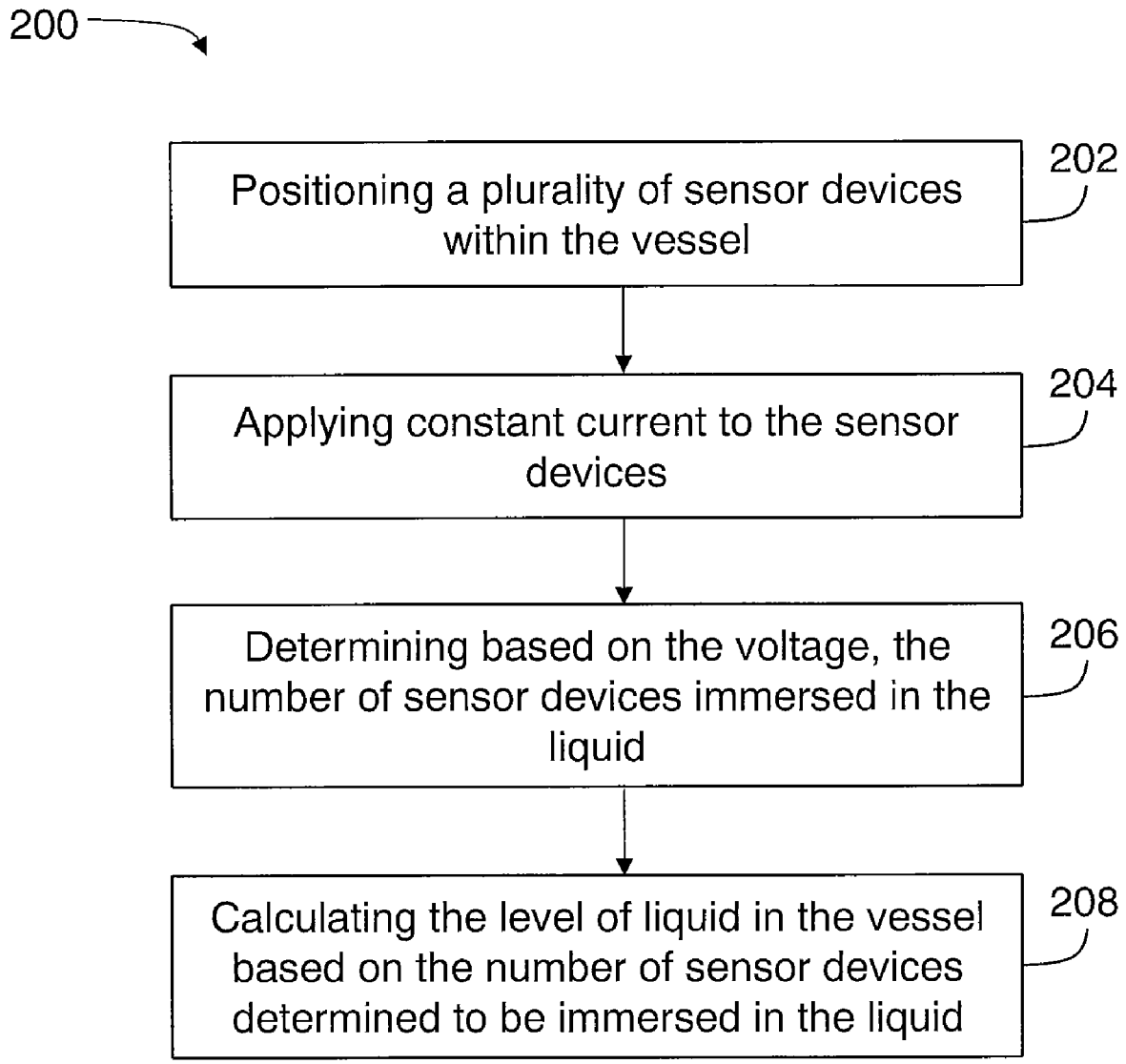
FIG. 5 is a flowchart illustrating a method for liquid volume measurement within a vessel.

FIG. 5 is a flowchart 200 illustrating one embodiment of a method for measuring a level of liquid in a vessel. As illustrated in flowchart 200, the method includes positioning 202 a plurality of sensor devices within the vessel, and applying 204 a constant current to the sensor devices. Based on an amount of voltage at the plurality of sensor devices, a number of the sensor devices that are immersed in the liquid is determined 206, and the level of liquid within the vessel is calculated 208 based on the number of the sensor devices determined to be immersed in the liquid.

In a specific embodiment of the method, as described above, positioning 202 the plurality of sensor devices within the vessel includes normalizing a placement of sensor devices 14 based on a contour of the interior of the vessel. More particularly, normalizing a placement of sensor devices 14 includes positioning sensor devices 14 with respect to one another based on a contour of the interior of the vessel as described above and illustrated in FIGS. 2, 3, and 4.

In one embodiment, the method for measuring a level of liquid in a vessel described by flowchart 200 further includes applying a constant current to one of sensor devices 14 that is immersed in the liquid, and using the voltage at that particular sensor device as a reference voltage for all sensor devices 14 immersed in the liquid. By assuming that all sensor devices 14 that are immersed in the liquid are going to have the same voltage across each, and by measuring the total amount of voltage by the total number of sensor devices 14, the number of sensor devices 14 immersed (and the number of sensor devices 14 not immersed) can be determined, and the level of liquid in the tank is proportional to the number of immersed sensor devices 14, based on their placement with respect to one another.

In an embodiment, and as described above, to determine the reference voltage, a unit (e.g., operational amplifier 28 (shown in FIG. 1)) outputs a signal based on an amount of voltage at the reference device 26 (shown in FIG. 1). The method illustrated by flowchart 200 utilizes the reference voltage and a unit (operational amplifier 22 (shown in FIG. 1)) to determine a number of sensor devices 14 that are immersed in the liquid by configuring the unit to output a signal based on an amount of voltage across all sensor devices 14 and referencing the signal to the signal based on the reference current. More specifically, by determining an amount of voltage across a single sensor device immersed in the liquid and conducting a constant current and determining the total voltage at the plurality of sensor devices 14 at the same constant current, a number of sensor devices 14 that are immersed in the liquid can be calculated. As described above, the number of the sensor devices that are immersed in the liquid is proportional to the level of liquid in the vessel.

Figure 6:
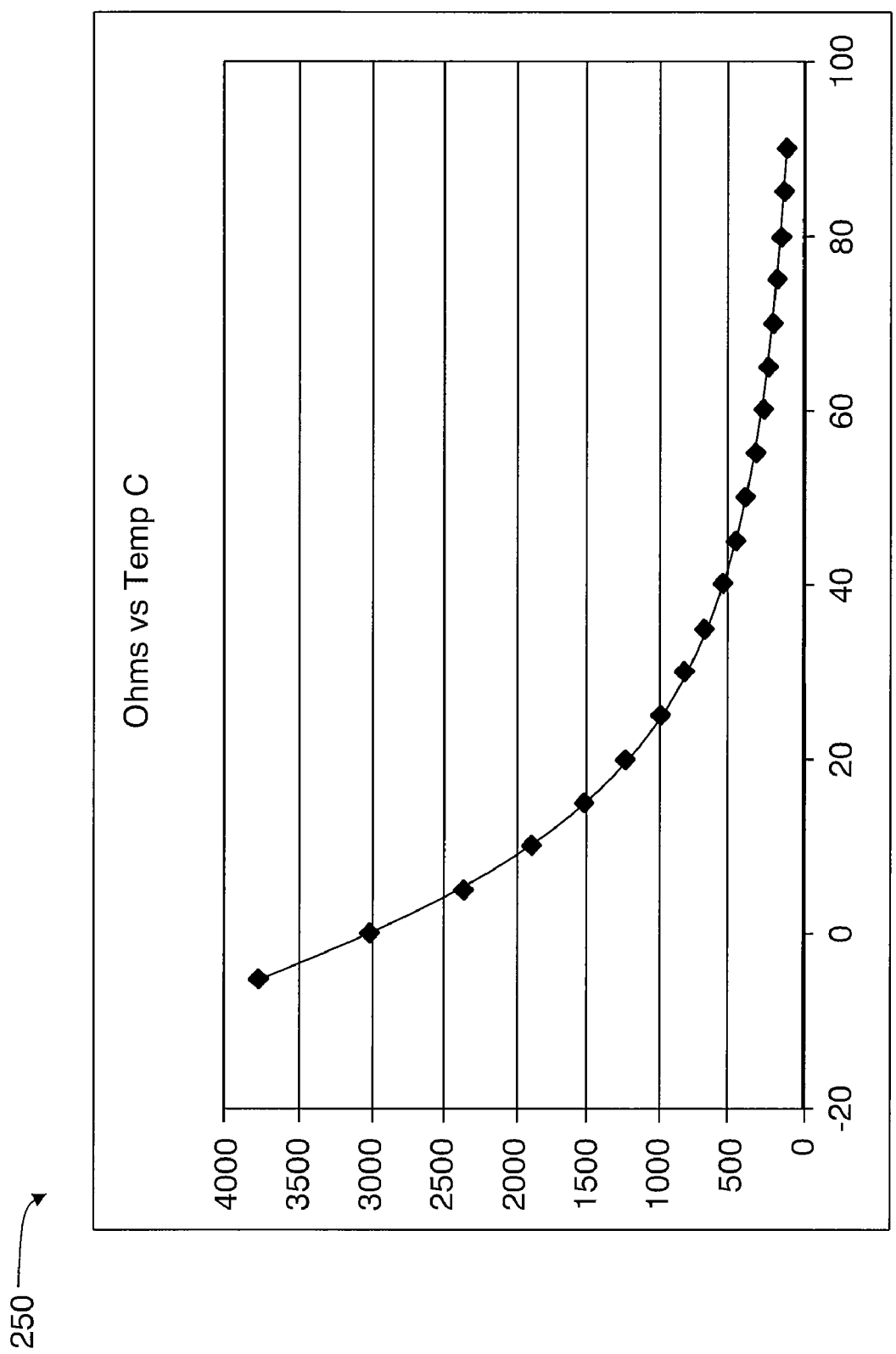
FIG. 6 is a graph illustrating the resistance change in a particular thermistor as a function of temperature change.

FIG. 6 is a graph 250 illustrating the resistance change in a particular thermistor as temperature changes. Graph 250 illustrates that, depending on a temperature of a liquid in which a thermistor is immersed, and the temperature that a non-immersed thermistor device will attain when conducting a constant current the difference in resistance can be significant. Therefore the voltage difference across a non-immersed thermistor and an immersed thermistor can be significant making a determination of which thermistors are immersed (and which are not) fairly easy. Even when the temperature difference between immersed and non-immersed is not significant, devices such as A/D converters and the like have the accuracy needed to allow users to distinguish between which sensor devices are immersed in a liquid and which are not.

While the invention has been described in terms of various specific embodiments, those skilled in the art will recognize that the invention can be practiced with modification within the spirit and scope of the claims.

What is claimed is:

1. An apparatus for measuring a volume of liquid within a vessel, said apparatus comprising:
    a plurality of devices connected in series, each having electrical properties that are dependent on temperature;
    a reference device, having electrical properties that are dependent on temperature;
    a first constant current source supplying a first current to said plurality of devices;
    a second constant current source supplying a second current to said reference device, wherein the first current and the second current are substantially the same; and
    a unit configured to output a signal based on a voltage at said plurality of devices and a voltage at said reference device, the amount of voltage at devices immersed in the liquid distinguishable from the amount of voltage at devices not immersed in the liquid.

2. An apparatus according to claim 1 wherein said plurality of devices comprises a plurality of thermistors.

3. An apparatus according to claim 1 wherein said plurality of devices are placed within the vessel according to one or more dimensions of the vessel.

4. An apparatus according to claim 1 wherein the reference device is placed within the vessel such that it is assumed to be immersed in liquid at all times.

5. An apparatus according to claim 1 wherein the voltage at the reference device and a voltage at the plurality of devices that are immersed in the liquid is partially based on a temperature of the liquid.

6. An apparatus according to claim 1 further comprising a glass passivation layer configured to protect said plurality of devices from any corrosive chemicals in the liquid.

7. An apparatus according to claim 1 wherein the voltage output by said unit is indicative of the number of devices immersed in the liquid.

8. An apparatus according to claim 7, said apparatus configured to indicate a level of liquid in the vessel based on the voltage output by said unit.

9. A method for measuring a level of liquid in a vessel, said method comprising:
    positioning a plurality of sensor devices within the vessel;
    applying a first constant current to the plurality of sensor devices, wherein the plurality of sensor devices are connected in series within the vessel;
    applying a second constant current to a reference sensor device within the vessel, wherein the first constant current and the second constant current are substantially the same;
    measuring a voltage at the plurality of sensor devices and a voltage at the reference device to determine a number of sensor devices that are immersed in the liquid; and
    calculating the level of liquid within the vessel based on the number of sensor devices determined to be immersed in the liquid.

10. A method according to claim 9 wherein positioning a plurality of sensor devices within the vessel comprises normalizing a placement of the sensor devices based on a contour of the interior of the vessel.

11. A method according to claim 10 wherein normalizing a placement of the sensor devices comprises positioning the sensor devices with respect to one another based on a contour of the interior of the vessel.

12. A method according to claim 9 wherein positioning a plurality of sensor devices within the vessel comprises positioning a plurality of thermistor devices within the vessel.

13. A method according to claim 9 wherein determining a number of the sensor devices that are immersed in the liquid comprises:
    determining an amount of voltage at the reference device immersed in the liquid; and
    calculating, based on a total voltage at the plurality of sensor devices and the determined amount of voltage at the reference device, a number of sensor devices that are immersed in the liquid.

* * * * *